Oct. 6, 1970  A. B. EREKSON  3,532,516
APPARATUS FOR FORMING A CONTINUOUS RIBBON OF WRAPPED COMESTIBLE
Filed Nov. 14, 1968  3 Sheets-Sheet 1

ARTHUR B. EREKSON
INVENTOR

BY John L. Segaloe
ATTORNEY

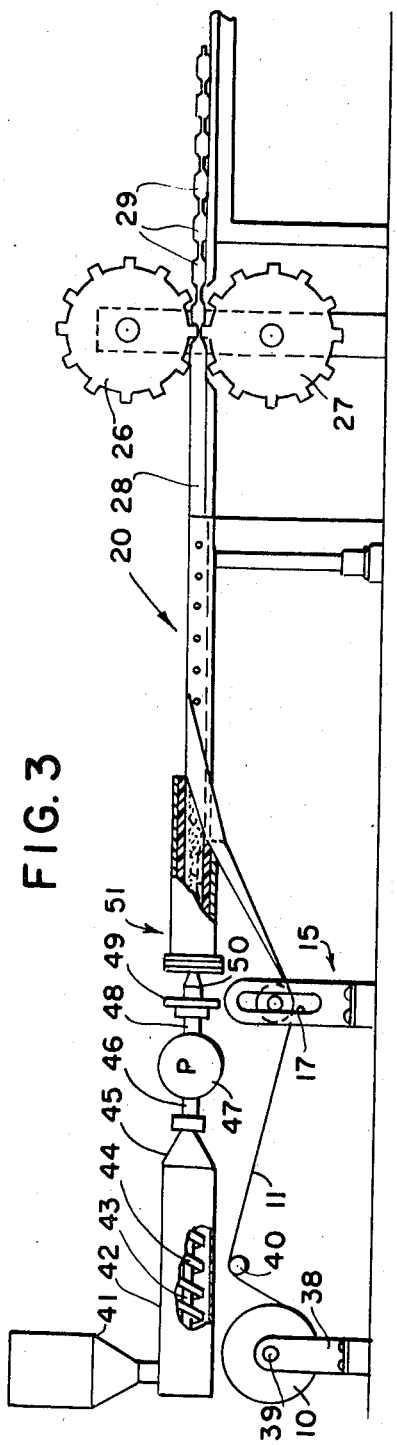
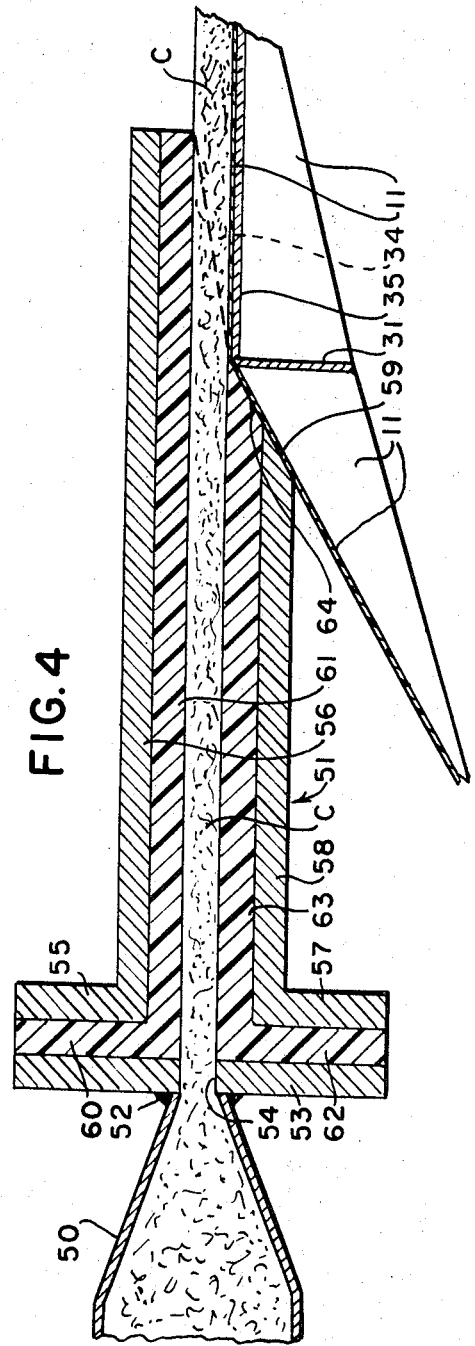

Oct. 6, 1970   A. B. EREKSON   3,532,516
APPARATUS FOR FORMING A CONTINUOUS RIBBON OF WRAPPED COMESTIBLE
Filed Nov. 14, 1968   3 Sheets-Sheet 3
FIG. 5
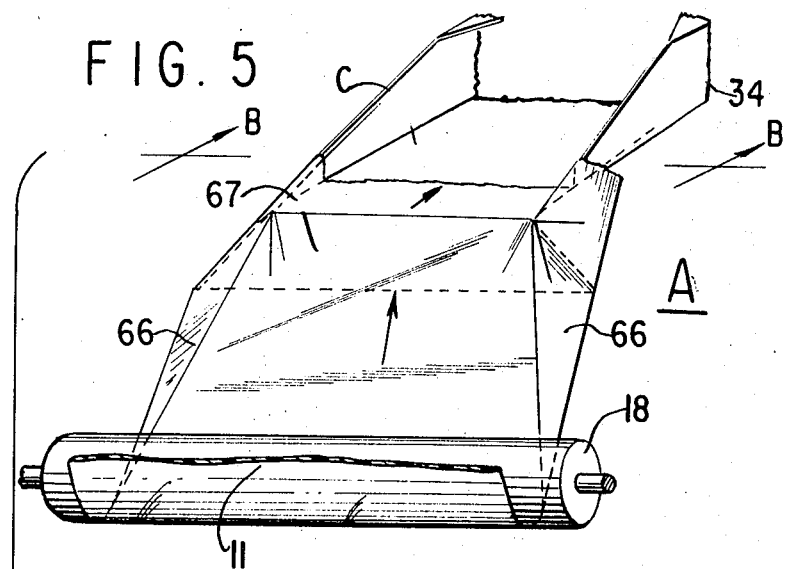
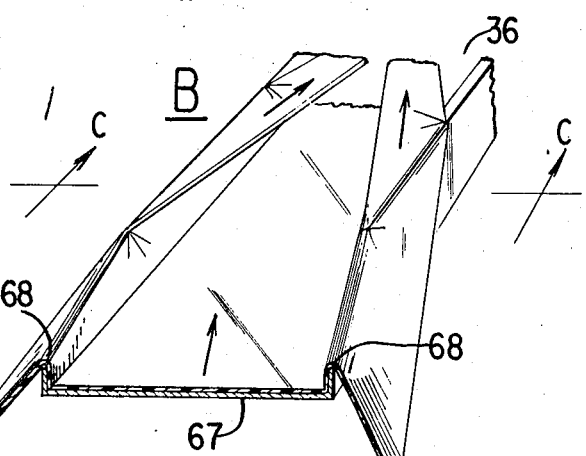
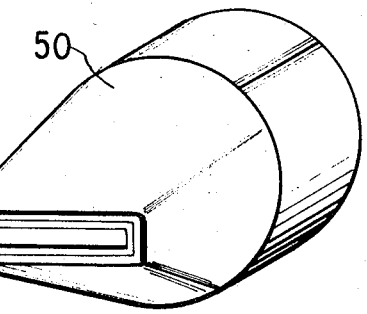
FIG. 6
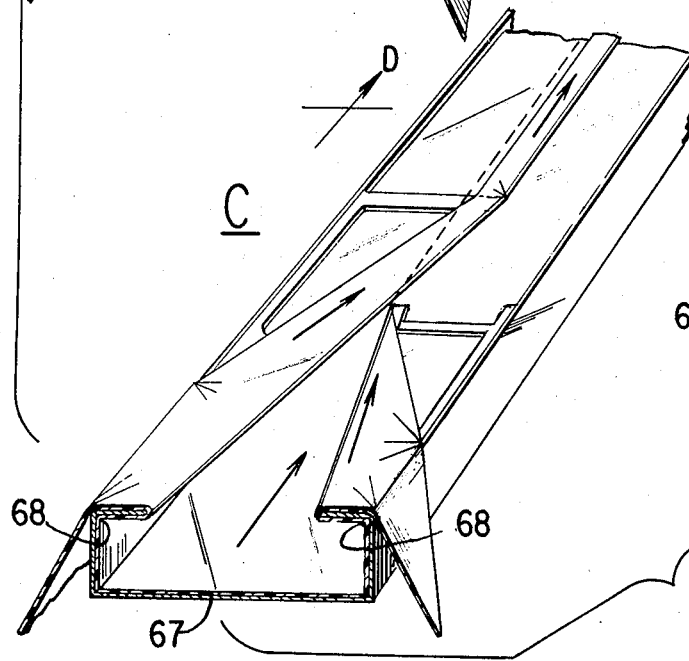
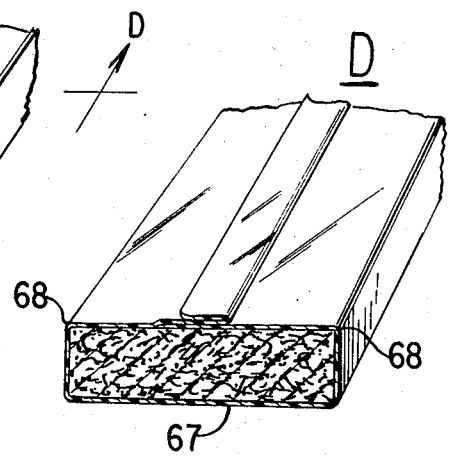
INVENTOR
ARTHUR B. EREKSON
BY
ATTORNEY United States Patent Office 3,532,516
Patented Oct. 6, 1970

---

3,532,516
APPARATUS FOR FORMING A CONTINUOUS RIBBON OF WRAPPED COMESTIBLE
Arthur B. Erekson, Scarsdale, N.Y., assignor to The Borden Company, New York, N.Y., a corporation of New Jersey
Continuation-in-part of application Ser. No. 661,661, Aug. 18, 1967. This application Nov. 14, 1968, Ser. No. 776,862
Int. Cl. B65b 25/06
U.S. Cl. 99—174                                                                                            11 Claims

ABSTRACT OF THE DISCLOSURE

This invention relates to apparatus for geometrically constructing a wrapped comestible from a flat film comprising means for supplying said film, means for moving said film, orientation means for presenting said film at an angle, shaping means adapted to form said film into a flat horizontal midsection defining interior edges with downwardly and outwardly projecting edge portions, comestible depositing means, and means for overlapping the interior edges about the comestible.

BACKGROUND OF THE INVENTION

This application is a continuation-in-part of U.S. application Ser. No. 661,661 filed on Aug. 18, 1967 which is to be abandoned.

Heretofore, various apparatus have been used for the wrapping of confections, comestibles, and viscous foodstuffs within a continuous ribbon of material such as plastic film or the like. Once wrapped, the continuous ribbon is usually crimped into individual sections, separated or cut apart, and packaged for sale in stores and markets. One example of such apparatus is set forth in the Brandenberger Pat. No. 2,505,603, which discloses advancing a continuous ribbon of thin, plastic film formed into a U-shaped trough to receive the comestible and thereafter overlapping the plastic material on top of the comestible.

High production apparatus such as suggested by Brandenberger have been favorably received in the industry which supplies comestibles due to its capability of meeting the demands of the consumer. However, various problems have been encountered in utilizing a machine of this type, namely, a persistent occurrence of wrinkles and/or entrapment of air in the wrapper, detracting from the appearance of the finished product. Additionally, there has been a continuous inability to produce wrapped slices in uniform thicknesses.

Various attempts have been made to overcome the problems above stated, such as, operating the apparatus at slower speeds, and through successful in overcoming, to a degree, the occurrence of wrinkles, such suggestions are nonetheless commercially unacceptable because of the resultant increased production costs.

The previous attempts have not however concerned themselves with the essence of the problem which directly causes the occurrence of wrinkles in the wrapper. More specifically, no attention has been given to the path lengths of travel of points spaced transversely across the flat sheet of films as it is advanced beneath the comestible depositing apparatus. Accordingly, the edges of the film frequently travel a much greater distance than points on the midpoint midsection where the comestible is deposited, causing inconsistent stresses in the finished product, and consequently wrinkles.

SUMMARY OF THE INVENTION

The present invention overcomes the heretofore stated deficiencies in the prior art of forming a continuously wrapped comestible by exercising a high degree of control over the path lengths traveled by points spaced transversely across the film. More particularly, the invention contemplates subjecting the film to a series of shaping steps which insures that the edges travel the same distance as the midsection to eliminate any buildup of stresses in the finished product. The shaping process, in effect, geometrically constructs a flat sheet of film into a continuous, rectangular envelope, the thickness of which is defined by the desired thickness of the comestible.

Briefly stated, the present invention comprises means for supplying said film, means for moving said film, orientation means for presenting said film at an angle, shaping means adapted to form said film into a flat horizontal midsection defining interior edges with downwardly and outwardly projecting edge portions, comestible depositing means and means for overlapping the interior edges about the comestible.

BRIEF DESCRIPTION OF THE DRAWINGS

The various features of the apparatus of this invention will become apparent from the following detailed description set forth in connection with the accompanying drawings which relate to the preferred embodiment of the present invention and are given by way of illustration.

FIG. 3 is a schematic diagram of another embodiment of the present invention.

FIG. 4 is a cross sectional view of the extruder head used in the embodiment of FIG. 3.

FIG. 5 is a sequential schematic view of the geometric construction of a flat sheet of film into a continuous wrapped ribbon of a comestible.

FIG. 6 is perspective view of the orifice 50 in the embodiment of FIG. 3.

DETAILED DESCRIPTION OF THE INVENTION

Figure 1:
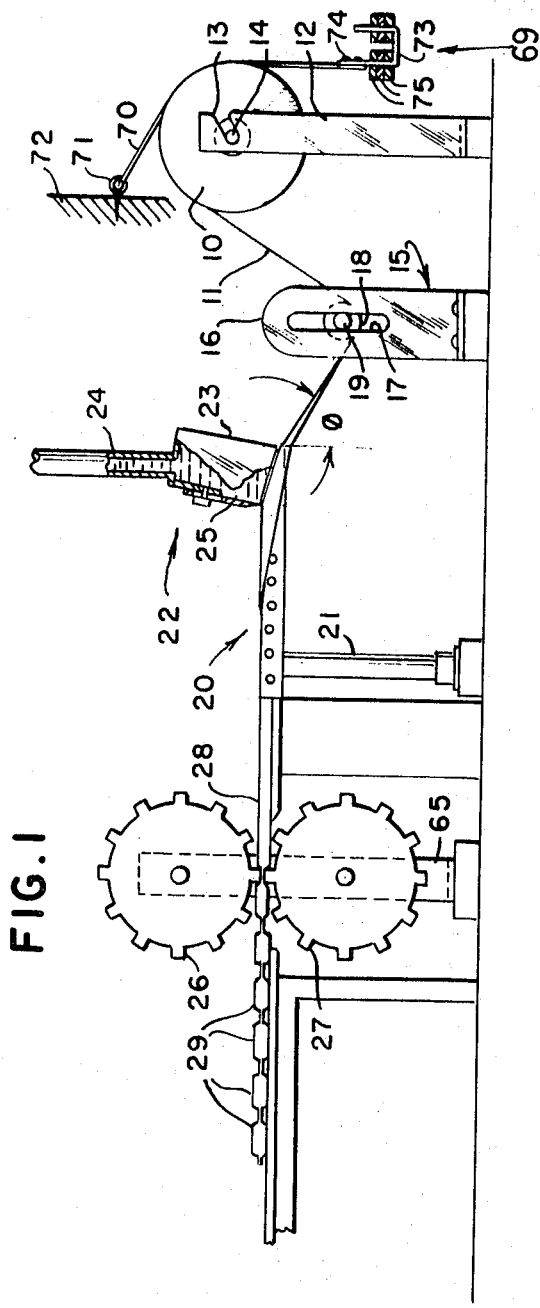
FIG. 1 is a schematic diagram of one of the embodiments of the present invention.

Referring to the embodiment illustrated in FIG. 1, there is shown a roll 10 having a length of film 11 wound thereon and adapted to be unreeled for use with the apparatus. The film may be of polyethylene, polyvinyl chloride, polyvinylidene chloride, cellophane, or any other like wrapping material which is used in the packaging of foodstuffs or comestibles. The roll 10 is rotatably mounted on a pair of upstanding posts 12 having angularly disposed slots 13 provided therein adjacent the upper extremities which receive an axle or shaft 14 passed through the roll. The film 11 is withdrawn from the roll 10 by the application of tensile stresses, which will be set forth hereinafter. In order to insure that the film is always subjected to a controlled tension, a braking device 69 is utilized to control the rotational speed of the shaft 14. Though any conventional braking apparatus may be used, in the embodiment illustrated in FIG. 1 a flexible strap 70 of leather or the like is pivotally connected by a hinge 71 to an upstanding surface 72. The strap 70 is draped over the roll 10 and extends downwardly where it terminates in a hook 73 secured by brads 74. Disks 75, each of which is of a known weight, having apertures therethrough are placed over the hook 73 to create a reverse moment on the roll 10 to counteract the tensile stresses used to unreel the film. The flexible strap 70 rides on the film, without scuffing or abrading same, so that a reverse moment is always applied to the roll despite any changes in diameter occasioned by the removal of film.

Spaced horizontally from the mounting posts 12 is orienting means 15 which includes a pair of upstanding posts or supports 16 having vertically disposed slots 17. The slots 17 receive a vertically movable roller guide 18 which is mounted on shaft 19, the ends of which project into the vertically disposed slots. The roller may be of a stainless steel or other like metallic material and its circumferential face is preferably machined to a very smooth finish to minimize friction between the film and the roller as the latter rides on the film. The film is drawn beneath the roller guide 18 and advanced upwardly to a position of comestible delivery. The weight of the roller guide is controlled to give the proper tension in conjunction with the brake 69. In addition, by controlling the weight of the roller guide 18, improper tensioning of the film is readily determined by observing either a failure of the guide to rotate or by noting its vertical displacement from the normal position in the slots 17. Accordingly, as the reverse moment on the roll 10 is increased by the addition of disks 75, the tension in the film is increased and the roller will ride upwardly in the slots 17 to indicate this increase in tension. An angle $\phi$ is defined by the angular orientation of the film upwardly to the position of comestible placement between a vertical plane passing through the point of placement and the film projecting upwardly thereto, as is best seen in FIG. 1. The magnitude of the angle $\phi$ is varied in proportion to the tension in the film 11 and in turn by the increase or decrease of the reverse moment applied to the roll 10. It has been found that optimum results in the wrapping of the comestible are obtained when the angle $\phi$ is maintained within a range of from about 45° to 60° This angular orientation of the film best complements the relationship of the angles used in the former 20, as will be discussed hereinafter.

The former 20 is horizontally disposed and maintained in such an orientation by stanchion 21. A comestible C is to be placed on the film 11 as it is advanced through the former by a comestible delivery means 22. In the embodiment illustrated in FIG. 1, the comestible, which is generally a viscous foodstuff such as cheese or the like in a molten condition, is supplied to the nozzle section 23 through a pipe 24 from a comestible reservoir (not shown). A doctor blade or scraper 25 is adjustably mounted by a slot and set screw arrangement on the leading edge of the nozzle 23 so that the thickness of the layer of comestible deposited on the film may be controlled by moving the blade relative to the nozzle 23.

A thin layer of the comestible is deposited on the film and the wrapping of the comestible takes place in a manner to be explained in detail hereinafter. A pair of vertically spaced crimping wheels 26 and 27, rotatably mounted on a pair of upstanding braces 65, are spaced from said comestible depositing apparatus 22 and are driven by a motor (not illustrated). The crimping wheels constitute the moving means for the film and apply the tension to the latter in its wrapped state to advance it through the various steps of the process. Once the film has been drawn through the former 20 thereby enrobing the comestible to form a continuous wrapped ribbon 28, the crimping wheels 26 and 27 pinch off the ribbon into sections or packages 29. The compressive force of the crimping lugs redistributes substantially all of the pliable comestible into adjoining packages, without deforming the upper surfaces of either, forming flat, two-ply sealed spaces therebetween. Sealing of the comestible within each package is effected along the upper surface by the clinging characteristics of the overlapped film edges whereas a minute layer of comestible remaining in two-ply space is thought to assist in the juxtaposed film layers to join the package edges. The arcuate spacing of the lugs defines the length of the packages. The packages are thereafter separated, at the sealed spaces, by a conventional cutting blade disposed at right angles to the ribbon to assure that each edge of an individual package is substantially straight. It should be appreciated that by this embodiment a high degree of control is exercised over both the cheese slice dimensions and weight. The crimping wheels 26 and 27 are given by way of illustration only, and other suitable moving and crimping apparatus, as for example, the pinch-off lugs disclosed in the Brandenberger patent may be incorporated into the instant embodiment.

Figure 2:
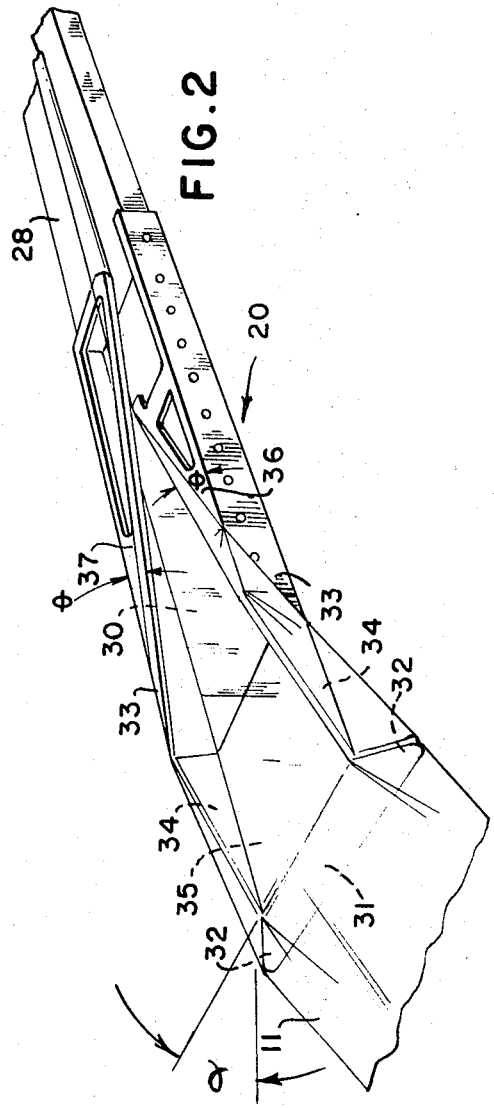
FIG. 2 is a detailed isometric perspective view of the former utilized in the embodiment of the present invention.

Turning now to the former 20 shown in detail in FIG. 2, horizontal base member 30 includes a downwardly projecting pattern 31, preferably disposed at right angles to the base but not so limited, and having outwardly flared wing portions 32 to form a trapezoid over which the edges of the film pass. An angle $\alpha$ is defined by the wing portions 32 with respect to a horizontal plane through the leading edge of base 30; it has been found that the optimal results are obtained when $\alpha$ is formed within a range of 15° to 25°. The base 30 includes vertically disposed sidewalls 33 having beveled sections 34 which commence at the leading edge adjacent pattern 31 to form the film drawn thereover into a comestible receiving configuration by erecting film edges at right angles to the film passing along the base 30 at the intersection with the former sidewalls; the full height of the erected film edges is defined by the sidewalls 33. The area 35 of base 30 between the beveled sections 34 and over which the nozzle 23 is disposed is lined with a substance having low coefficient of friction, such as Teflon or the like, to facilitate ease of movement of the film. The comestible is thus deposited concurrently with the shaping of the film by the beveled walls 34; thus a ribbon is geometrically constructed to the interior dimensions of the shaper 20 and defines the width and thickness of the wrapped comestible. The comestible is deposited in a thin layer and at a flow rate to full occupy the geometrically constructed package.

A pair of triangular guides 36 and 37, each lying in the same horizontal plane throughout their entire length, are mounted along the upper edges of the sidewalls 35 and project inwardly over the base 30. Both triangular guides commence at the point where the beveled walls 34 intersects the upper edge of sidewall 33. An angle $\theta$ defines the inwardly projecting orientation of each of the triangular guides, and the angular range defined by $\theta$ complements the angular range defined by angle $\alpha$. In practice, this range is generally about 5° to 15°. The vertical dimension of the sidewall 33 is equal to the desired thickness of the comestible deposited upon the film drawn through the former. The film edges are to be drawn beneath the triangular guides to overlap the upper surface of the comestible and are directed inwardly in the same horizontal plane, skimming over the comestible without disturbing the flat upper surface defined by the doctor blade 25 and the shaping of the film edges. The triangular guide 36 is shorter in length along the sidewall edge than the companion triangular guide 37 while extends inwardly over the base past the innermost edge of the triangular guide 36 to effect a final overlapping configuration of the film about the comestible. As the film is supplied to the former, the longitudinal centerline is offset slightly to the side of the former 20 on which guide 37 is mounted. Accordingly, as the ribbon 28 is formed, the edge of film 11 following guide 36 underlies the opposite edge, and guide 37 forms an additional outward fold on top of the ribbon to facilitate opening of a section of the film after it has been crimped and sliced.

Turning next to the embodiment set forth in FIG. 3, there is illustrated a horizontally disposed comestible depositing apparatus and pressure supply means therefor which has been found to be particularly suitable for delivering a pliable meat compound to be enrobed in a ribbon of film. This embodiment is preferably designed, though not so limited, to produce hamburger patties of a unique configuration, namely, a rectangular or square shape enveloped in a sealed film package. As in the embodiment in FIG. 1, a high degree of control is exercisable over the patty dimensions and weight. Production of rectangular meat patties by this process has numerous commercial advantages, namely, the patty shape is compatible with square bread slices now marketed, less space is required to produce the ribbon of hamburger meat than the known apparatus which stamp out round patties by a piston passing through a reciprocating plate having circular aperture over which a layer of meat is passed (see U.S. Pat. 3,203,037), there is less handling and consequently higher sanitation levels are maintainable, meat loss due to leakage around the reciprocating plate is substantially eliminated resulting in higher meat yield and less wastage, and finally, shelf life is longer since the sealed package retains moisture in the meat which ordinarily would be lost by dehydration during freezing. Moreover most round meat patties currently sold are separated only by sheets of paper or the like because of difficulty of enveloping them in a round, sealed package.

The embodiment utilizes the same orienting means 15 and former 20 which were described in connection with FIG. 1. A film roll 10 is rotatably mounted on a shaft 39 disposed in upright braces 38 so that the film 11 may be unreeled therefrom. Because the comestible deposit-in apparatus is horizontally arranged, the film is entrained over a pulley 40 and fed to the tensioning apparatus 15 beneath the comestible delivery apparatus in contrast to the embodiment of FIG. 1. A hopper 41 is adapted to receive the meat in a semi-frozen condition and passes same into a cylindrical container 42. A rotatable shaft 43 having drawn out helix screw threads 44 along the longitudinal face thereof is provided in the container to drivingly advance the meat to a conduit 46. The shaft is rotated in the container by a motor (not illustrated). The meat is received in inlet conduit 46 of a conventional constant flow pump 47 which insures that a continuous stream of meat at a constant pressure is maintained in outlet conduit 48. The pump is driven by a suitable prime mover such as an electric motor or the like (not shown). The meat is supplied under pressure to conversion orifice 50 via coupling 49. The orifice 50, shown in detail in FIG. 6, converts the continuous supply of meat from a circular cross section to a rectangular cross section and passes same into extruder head 51.

Referring more particularly to the detailed cross-sectional view set forth in FIG. 4, the extruder head 51 is T-shaped, and includes an upstanding outer wall 53. An axially-formed rectangular bore 54 passes through the outer wall 53 and is axially aligned with the opening in the orifice 50 and welded there by fillets 52. The extruder includes an outer sleeve 55 having an upstanding portion coextensive with wall 53 and a horizontally disposed portion 56. T-shaped hollow sleeve section 60 having an upstanding portion 62 and a horizontal portion 61 aligned with the aperture 54 is mounted within the sleeve 55 and suitably secured to the wall 53. The sleeve 60 is preferably formed of Teflon to minimize friction as the meat passes therethrough, though any element which has a low coefficient of friction may be utilized. The lower walls 58 and 63 of the extruder head 51 are beveled at edges 59 and 64 and the angularly supplied film 11 is passed along these edges to receive the comestible.

The extruder overlies the former 20 and the upper walls 56 and 61 of the sleeves are coextensive and terminate at the point where the beveled sidewalls 34 intersect the upper edge of sidewalls 33. The width of the extruder is approximately equal to the distance between the sidewalls 35 and the vertical dimension of the extruder opening is equal to the height of the sidewalls. The beveled edge 64 is parallel to and adjacent the leading edge of the former where trapezoidal pattern 31 is situated. Wrapping of the meat is effected in the same manner as was outlined in the embodiment of FIG. 1, and the crimping wheels 26 and 27 advance the ribbon of film and crimp same into sealed packages 29 to be separated and packaged.

Turning now to the sequential view of FIG. 5, there is illustrated the five steps which the film undergoes during the shaping process. Proceeding from top to bottom there is illustrated the sheet 11 in a flat state, whereafter it is drawn over the trapezoidal pattern 31 so that the edge portions 66 are drawn downwardly and outwardly to form a wrinkle-free flat midsection 67. The comestible ribbon is deposited on the flat midsection 67 contemporaneously with the forming of the troughlike configuration by the interior edge portions 68 as the upward movement of the latter encounters the beveled walls 34. No wrinkles occur in the edge portions 68 as they are moved upwardly to assume the sidewall portion of the wrapped ribbon of comestible because of the outwardly directed tensile stresses applied to the edges of the film as it is drawn over the trapezoidal pattern 31. The edge portions 68 are raised a distance equal to the thickness of the comestible. Immediately thereafter, the edge portions 66 of the film on both sides of the edges are directed inwardly in the same horizontal plane and in close proximity to the comestible surface to eliminate occurrence of air bubbles. The final sequential view of FIG. 5 illustrates the overlapping fold effected by the longer triangular guide 37 to permit easy opening of the slice after the ribbon has been crimped and cut into separate sections.

The relationship of the angles $\theta$, $\alpha$, and $\phi$, when maintained within the ranges disclosed, produce a wrinkle-free wrapped ribbon of comestible. It is apparent, however, that the absence of wrinkles in the finished product substantiates the theory that all points spaced transversely across the flat sheet of film travel substantially the same path length as they are geometrically constructed into a continuous rectangular envelope, the dimensions of which are proportional to the thickness of the comestible enrobed in the film. The high degree of control of the tensile stresses applied to the film during the geometrical construction of the rectangular envelope obviates the occurrence of buildups of stress concentrations in the finished product, i.e., there is a uniform distribution of the tensile stresses across the film throughout the entire process.

Although one embodiment of the present invention has been herein illustrated and described, it will be evident to those skilled in the art that various modifications may be incorporated into the details of production without departing from the principles herein set forth.

What is claimed is:
1. Apparatus for geometrically constructing a continuously wrapped comestible from a flat ribbon of film comprising:
 (a) means for supplying said film in a flat state under tension;
 (b) means for continuously moving said film;
 (c) shaping means interposed between said supply means and said moving means to form said film into a substantially flat midsection bordered by downwardly and outwardly projecting edge portions, said shaping means including means for erecting the edge portions along the border to a predetermined height;
 (d) means for continuously depositing a layer of said comestible on said midsection substantially concurrently with the erection of said edges at a level substantially equal to said predetermined height; and
 (e) means for directing the remainder of said edge portion inwardly over said comestible in the plane defined by the said predetermined height until said edges overlap to form a uniform, wrinkle-free ribbon of continuous-length wrapped comestible.

2. Apparatus according to claim 1 wherein said shaping means includes a trapezoidal pattern over which said film is drawn to define the flat midsection and edges.

3. Apparatus according to claim 1 wherein said depositing means in an extruder aligned with said shaping means to continuously deposit a thin layer of comestible onto said flat midsection contemporaneously with the erection of said edges.

4. Apparatus according to claim 1 wherein said shaping means includes a pair of spaced sidewalls of predetermined height; said sidewalls including leading beveled edges; said depositing aligned between said beveled edges to concurrently deposit combestible therebetween as the film edges are erected.

5. Apparatus according to claim 1 wherein said directing means is a pair of horizontally disposed triangular guide means lying in the same plane, one of said guide members being longer in length than the other said guide means whereby an edge of said film contacting said longer guide means is overlying the other said edge.

6. Apparatus accorrding to claim 1 including
   (f) means for crimping said ribbon of wrapped comestible to form spaced, individually sealed packages.

7. Apparatus according to claim 1 including
   (g) orienting means interposed between said shaping means and said supply means for presenting said film to said shaping means at angle defined from a vertical plane passed through the leading edge of said shaping means.

8. The method of geometrically constructing a continuously wrapped comestible from a flat ribbon of film comprising the following steps:
   (a) supplying said film in a flat state under tension;
   (b) drawing said film over a pattern to define a flat midsection bordered by downwardly and outwardly projecting edges;
   (c) depositing a layer of said comestible of a preselected thickness onto said midsection while erecting the edges to a height equal to said thickness to construct a uniform, continuous-length open-top ribbon of comestible;
   (d) directing the remaining edge portions of said film inwardly over said comestible in the plane defined by said predetermined height until said edges overlap to form a uniform, wrinkle-free ribbon of wrapped comestible.

9. The method according to claim 8 including the steps of:
   (a) crimping said ribbon of wrapped comestible into spaced, individually sealed packages.

10. The method according to claim 8 wherein said crimping steps distributes said wrapped comestible into said packages leaving a sealed, two-ply, comestible-free space therebetween.

11. The method according to claim 8 including
    (a) the step of advancing said film upwardly to said pattern at an angle of from about 45° to about 60° with respect to a vertical plane passed through said pattern.

References Cited

UNITED STATES PATENTS

| | | | |
|---|---|---|---|
| 2,505,603 | 4/1950 | Brandenberger. | |
| 2,886,930 | 5/1959 | Martin | 53—180 |
| 2,919,990 | 1/1960 | Podlesak | 99—178 |

FRANK W. LUTTER, Primary Examiner

U.S. Cl. X.R.

53—28, 180; 99—178